United States Patent [19]

Pearson et al.

[11] Patent Number: 4,467,610
[45] Date of Patent: Aug. 28, 1984

[54] GAS TURBINE FUEL SYSTEM

[75] Inventors: Carl E. Pearson, Swampscott; Timothy J. Higgins, Arlington, both of Mass.

[73] Assignee: General Electric Company, Lynn, Mass.

[21] Appl. No.: 255,191

[22] Filed: Apr. 17, 1981

[51] Int. Cl.³ .............................................. F02C 1/00
[52] U.S. Cl. ....................................... 60/739; 60/742; 60/746; 138/114; 285/13
[58] Field of Search ................ 60/739, 742, 746; 137/118; 138/114; 285/13, 115, 114; 431/119; 239/104, 120, 550

[56] References Cited

U.S. PATENT DOCUMENTS

| | | | |
|---|---|---|---|
| 3,949,775 | 4/1976 | Cornell | 137/118 |
| 4,028,888 | 6/1977 | Pilarczyk | 60/739 X |
| 4,036,246 | 7/1977 | Cornell | 137/118 |
| 4,149,568 | 4/1979 | Kuntz et al. | 138/114 |

OTHER PUBLICATIONS

General Electric-CF6-6 Engine Maintenance Manual-7/1975.

Primary Examiner—Carlton R. Croyle
Assistant Examiner—Donald E. Stout
Attorney, Agent, or Firm—F. L. Conte; D. P. Lawrence

[57] ABSTRACT

A gas turbine engine is provided with an improved fuel system that features a fuel manifold with a primary and secondary fuel flowpath circumventing a combustor section of the engine. The manifold is formed with a double-walled construction for the purpose of withstanding high temperatures or fires around the combustor section and, additionally, to provide a secondary flowpath for draining any fuel leakage from the manifold. The two walls of the manifold include an inner wall that encloses the primary fuel flowpath through the fuel system. A concentric outer wall encloses the inner wall and protects the primary fuel flowpath. The double-walled system is made possible with a unique manifold assembly utilizing double-walled manifold segments that interconnect fuel flowpaths through fuel injector base sections. When assembled, these parts connect together to form an integral double-walled fuel manifold assembly.

8 Claims, 6 Drawing Figures

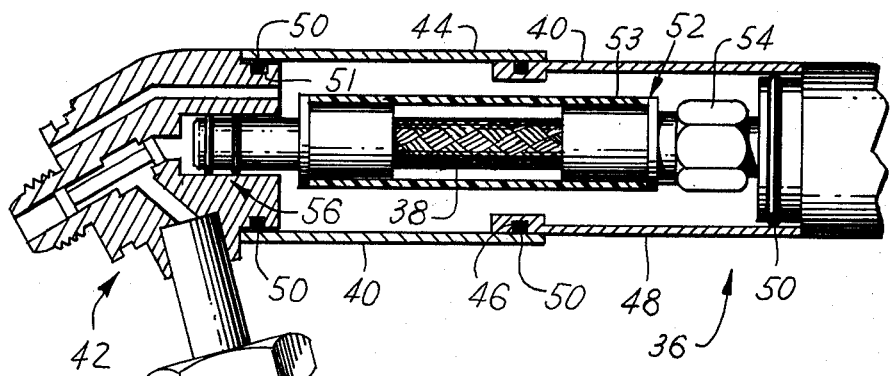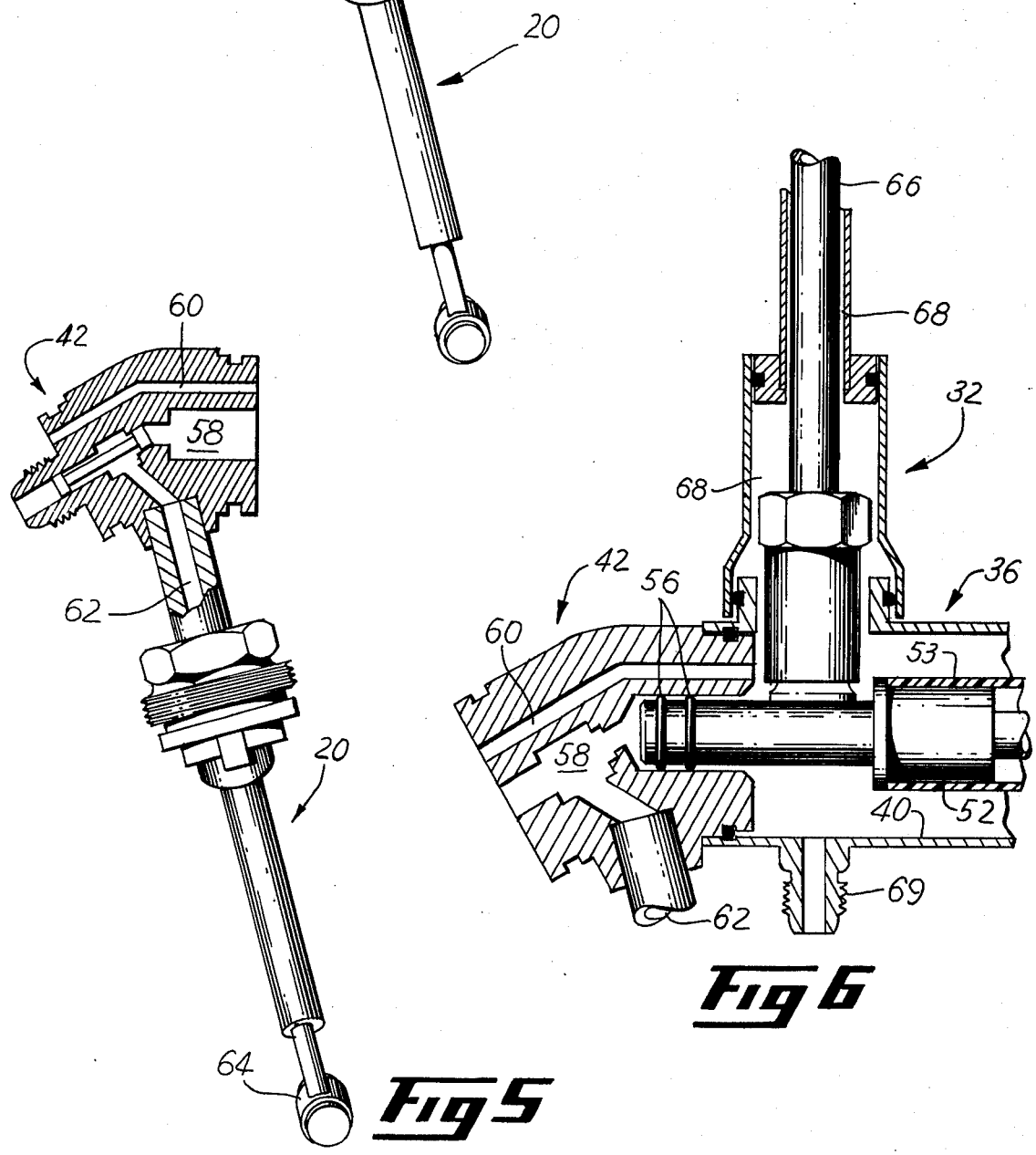

GAS TURBINE FUEL SYSTEM

BACKGROUND OF THE INVENTION

1. Field of the Invention

This invention relates to fuel systems for use in gas turbine engines.

2. Summary of the Prior Art

In order to operate efficiently, gas turbine engines must be run at very high temperatures. As one would expect, these temperatures get particularly high in a combustor section of the engine where engine fuel is burned. High combustor temperatures are necessary in order to fully ignite the fuel and, additionally, to derive the maximum amount of energy available from the burning fuel. As the fuel is ignited, it combines with high pressure air to form high-temperature, high-pressure combustion gases. These gases are utilized downstream of the combustor by a turbine section where the kinetic energy of the gases is transformed into useful mechanical energy. Under basic thermodynamic principals, increasing the temperature and pressure of the combustion gases increases the amount of mechanical energy produced.

Because of the necessarily high combustor temperatures, an engine fuel system must be provided that is capable of safely and reliably supplying a continuous flow of fuel to the combustor during high temperature engine operation. Typically, in the present state of engine development, fuel systems are subjected to temperatures in excess of 800° F. (426.67° C.). The Federal Aviation Authority (FAA) requires that commercial engine fuel systems undergo a flame endurance test to show that a particular engine's fuel system is capable of safe operation in this harsh environment. At least one aircraft engine manufacturer, namely the assignee of the subject invention, additionally requires that the fuel system must be capable of carrying any fuel leakage overboard in the event a fitting or a line in a primary flowpath should fail.

SUMMARY OF THE INVENTION

It is, therefore, an object of the present invention to provide a fuel-supply system that is capable of safe operation in the high-temperature environment surrounding a gas turbine engine combustor.

It is another object of the present invention to provide a gas turbine fuel-supply system that features a primary and a secondary fuel flowpath for the purpose of carrying any leakage fuel overboard in the event of a failure in a part of the primary fuel flowpath.

It is another object of the present invention to provide a gas turbine fuel-supply system of a simple, functional construction with a minimum of parts that might cause problems in the high temperature environment of the region surrounding the engine combustor.

These and other objects are accomplished by the present invention that features a unique fuel manifold circumventing a combustor section of a gas turbine engine. The fuel manifold comprises a plurality of manifold segments that interconnect a plurality of fuel injector base sections to form an integral fuel manifold assembly. The manifold construction provides a primary fuel flowpath enclosed within a plurality of walls. In one embodiment the primary flowpath is formed within an inner flexible tubular wall and is surrounded by a secondary fuel flowpath within a concentric, outer tubular wall. This double-walled feature thereby provides flame and thermal protection to the primary fuel flowpath and, additionally, provides a means of collecting any possible leakage fuel for the purpose of carrying it overboard.

To accommodate thermal expansion and contraction, the manifold segment outer walls have telescoping sleeves. The sleeves slide in a telescoping fashion during temperature variations. The manifold segment inner walls slideably interconnect with machined passages through base sections of the injectors. The slideable interconnection accommodates thermal effects and any tolerance stackup with a male-female interaction.

When fully assembled these parts connect together to form an integral double-walled fuel manifold assembly.

DESCRIPTION OF THE DRAWINGS

The present invention will become more clearly understood by reference to the appended specification in conjunction with the drawings wherein:

FIG. 4 depicts a cross-sectional view of a fuel manifold segment that forms a part of the present invention;

FIG. 5 depicts a view, partly in cross-section and partly broken away, of a fuel injector that forms a part of the present invention;

FIG. 6 depicts a cross-sectional view of a fuel-supply tube and a portion of a fuel manifold segment of the present invention.

Referring now to FIG. 1, a typical gas turbine engine 10 is illustrated in a manner that shows where basic engine components are located in relation to each other. Starting at an upstream end of the engine 10, outside air flows into the engine at an engine intake 12. This air is initially compressed and accelerated by an engine fan 14. The air then enters a compressor section 16 where the air is further compressed to the point where it can fully support the combustive process.

Figure 1:
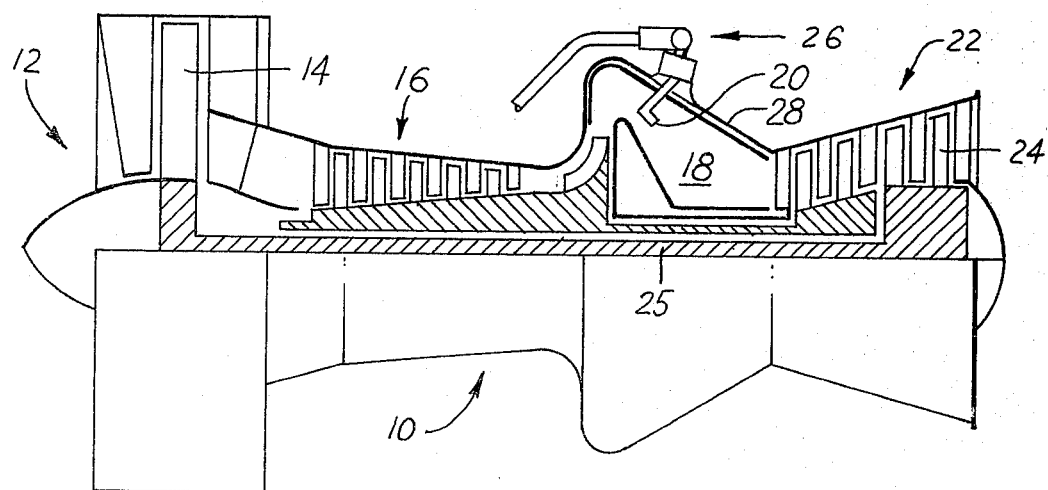
FIG. 1 depicts a cross-sectional view of a typical gas turbine engine.

Combustion actually occurs in a combustor 18. The compressed air is derived from the compressor 16, mixed with fuel and directed into the combustor 18 by a fuel injector 20. The air-fuel mixture is continuously ignited and burned inside the combustor 18 to form high-pressure, high-temperature combustion gases that provide a source of energy to the engine 10.

In order to make use of that source of energy, the combustion gases are directed at a high velocity into a turbine section 22 where the gases drive a rotatable turbine rotor 24. The turbine rotor 24, in turn, provides power to a turbine shaft 25 which can then be utilized to direct mechanical energy to whatever end use is desired. Ultimately the shaft 25 might be used to power an airplane propeller, a helicopter blade, a fan providing forward thrust, or for any of a number of other useful purposes.

One of the problems inherent in the operation of a gas turbine engine is the effect of high temperatures that are developed in the region of combustion. These high temperatures put a tremendous thermal strain on engine components which must structurally accommodate the effects of thermal expansion and contraction. Even more importantly, safety hazards caused by high temperatures must be fully considered by the engine designers. Fuel leakage considerations become important in the area surrounding the combustor 18 where the fuel must be directed by a fuel system 26 in a safe and reliable manner. In a typical gas turbine engine, the fuel system 26 must be capable of withstanding temperatures in excess of 800° F. (426.67° C.) that commonly exist around a combustor outer casing 28.

Figure 2:
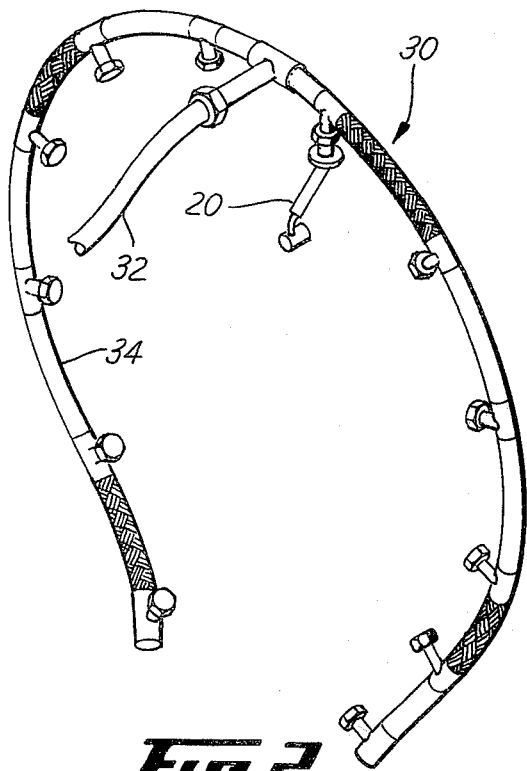
FIG. 2 depicts a perspective view of a prior art fuel-supply system.

Referring now to FIG. 2, a prior art fuel-supply system 30 is shown that might be used on an engine such as that shown in FIG. 1. This system is comprised of a fuel-supply tube 32 and a fuel manifold 34. Typically, the manifold 34 is extended around the engine's combustor outer casing to supply fuel to a plurality of fuel injectors 20. The injectors then direct the fuel into the combustor for supporting the combustion process.

Figure 3:
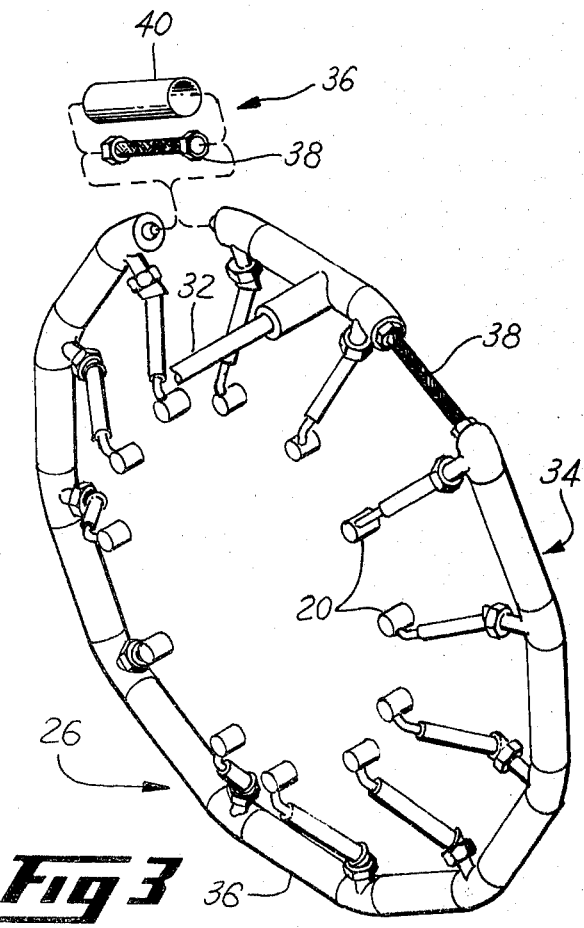
FIG. 3 depicts a perspective view of a partially disassembled fuel-supply system in one embodiment of the present invention.

Referring now to FIG. 3, a fuel system that comprises one embodiment of the present invention is shown in a partially disassembled form.

Again this fuel system 26 might be used on a typical gas turbine engine such as that shown in FIG. 1. The system 26 includes a fuel-supply tube 32 that supplies fuel to a fuel manifold 34. The manifold 34 circumvents combustor outer casing (not shown in FIG. 3) and supplies fuel to each of a plurality of fuel injectors 20.

A unique feature of the applicants' fuel system is that the manifold 34 is comprised of a construction that provides a plurality of walls enclosing a primary fuel flowpath. This is made possible by using double-walled manifold segments 36 that interconnect the fuel injectors 20 that are machined with dual fuel flowpaths to form an integral double-walled fuel manifold assembly. With this form of construction, the manifold provides a primary fuel flowpath inside an inner wall 38 in the form of a hose and a secondary fuel flowpath between the inner wall 38 and an outer wall 40. In FIG. 3, an inner wall 38 and outer wall 40 of one complete manifold segment are shown next to the partially disassembled fuel manifold 34.

The secondary flowpath is provided for directing any leakage fuel that escapes the primary flowpath to the fuel supply tube 32 from which the fuel leakage is drained overboard of the engine. The outer wall 40 also provides a thermal insulator and fire shield for the protection of the primary flowpath. In alternate embodiments, additional fuel flowpaths might be provided.

Referring now to FIG. 4, a complete manifold segment 36 and a base section 42 of an injector 20 are shown. In this Figure, the double-walled form of construction of the manifold can be readily appreciated. In the embodiment shown, the outer wall 40 is comprised of two or more telescoping sleeves 44 and 48. Where the sleeves are concentric, a groove 46 is formed in an inner sleeve 48 and an O-ring 50 is inserted in the groove to provide a slideable interconnection between the inner sleeve and an outer sleeve 44 in a manner that seals where the sleeves overlap. This slideable interconnection between the sleeves permits the segment 36 to expand and contract with a telescoping action. The assembly thereby inherently accommodates physical displacement at the assembly interconnections. The sleeves are also sealed with O-rings 50 provided in detents 51 at the connections with the injector bases 42 as a means of mechanical attachment and fluid sealing.

In one embodiment of the invention, the inner wall 38 is a part of a teflon hose assembly 52. As an additional barrier, the hose assembly 52 can be encased in a firesleeve 53. At one end of the hose assembly 52, a fluid mechanical connector 54 is used to connect the assembly 52 to the injector base 42. At the other end, the assembly 52 is inserted into the fuel injector base to form a male-female interconnection with a double O-ring seal 56. The male-female interconnection permits the hose assembly 52 to slide within the injector base to accommodate thermal growth and mechanical tolerances.

Referring now to FIG. 5, a fuel injector 20 is shown in one embodiment that is utilized in the present invention. As in the case of the double-walled manifold segments 36, the injector base 42 is provided with both a primary and a secondary fuel flowpath. The primary path is an inner passage 58 through the base 42, with openings at either end that are in flow communication with the primary flowpath of the adjoining segments 36. The secondary fuel flowpath is an outer passage 60 that is in flow communication with the secondary flowpath in each adjoining segment. With this unique interconnection between the segments 36 and the injectors 20, the fuel manifold assembly is provided with a double-walled construction that includes complete primary and secondary fuel flowpaths.

Inside the injector, a fuel flow passage 62 is extended through a full length of the injector body to an injector spray tip 64. The fuel is sprayed out of the injector tip 64 into the engine combustor to supply the combustion process.

Referring now to FIG. 6, a portion of the fuel-supply tube 32 is shown where it intersects a manifold segment 36. Again, as in the case of the fuel manifold, a double-walled construction is used to provide a primary and secondary fuel flowpath. The primary flowpath 66 of the supply tube 32 is in direct flow communication with the primary flowpath of the injector base 42, and similarly, the secondary flowpath 68 of the supply tube is in direct flow communication with the secondary flowpath of the injector base 42. This permits leakage fuel to be drained away from the fuel manifold through a drain fitting 69.

It will become obvious to one skilled in the art that several changes and variations can be made to the above-described invention without departing from the broad inventive concepts thereof. It is intended that the appended claims cover these and all other variations in the present invention's broader inventive concepts.

Having thus described the present invention, what is claimed as novel and desired to be secured by Letters Patent of the United States is:

1. For a gas turbine engine having a combustor, a fuel-supply system for supplying fuel to the combustor and a plurality of fuel injectors for carrying fuel through a combustor outer casing to inject the fuel inside the combustor, an improved fuel-supply system comprising:

a fuel manifold positionable around the combustor outer casing and including a primary fuel flowpath effective for providing fuel to said fuel injectors and a secondary fuel flowpath effective for collecting any leakage fuel that escapes said primary flowpath, wherein said fuel manifold is comprised of:

a plurality of manifold segments and a plurality of fuel injector base sections, said manifold segments interconnecting said base sections of said fuel injectors, each of said manifold segments being effective for accommodating thermal expansion and contraction to reduce thermal strain and comprising an annular inner wall defining a first portion of said primary fuel flowpath and an annular outer wall spaced from and surrounding said inner wall for defining therebetween a first portion of said secondary fuel flowpath; each of said injector base sections having an inner passage defining a second portion of said primary fuel flowpath, said inner passage being in flow communication with said first annular inner wall of an adjoining manifold segment; and wherein each injector base section also has an outer passage defining a second portion of said secondary fuel flowpath, said outer passage being in flow communication with said annular outer wall of each adjoining manifold segment.

2. The improved fuel-supply system recited in claim 1 wherein the fuel manifold segments have telescoping sleeves for the purpose of accommodating physical displacement at manifold assembly interconnections.

3. The improved fuel-supply system recited in claim 1 wherein each segment is provided with telescoping outer sleeves to form portions of said outer wall of said fuel manifold, and wherein each segment is also provided with a concentric inner sleeve that slideably interconnects with said inner passage of said base section of each of said fuel injectors thereby forming said inner wall to house said primary fuel flowpath.

4. The improved fuel-supply system recited in claim 1 wherein each of said manifold segments includes at least one sleeve forming said outer wall of the segment and a hose assembly forming said inner wall of the segment.

5. The improved fuel-supply system recited in claim 1 wherein the outer wall of each segment comprises at least two telescoping sleeves that are provided with a seal where the two sleeves overlap.

6. The improved fuel-supply system recited in claim 1 wherein said annular inner wall comprises a hose assembly that is inserted into the inner passage of said fuel injector base section and wherein the hose assembly is provided with a slideable sealing structure between the hose assembly and the fuel injector base section.

7. The improved fuel-supply system recited in claim 1 and further including a double-walled fuel-supply tube that supplies fuel to the fuel manifold and wherein said supply tube comprises:
   a supply tube primary flowpath communicating with the primary fuel flowpath of the fuel manifold; and
   a supply tube secondary flowpath communicating with the secondary flowpath of the manifold for the purpose of draining any leakage fuel.

8. The improved fuel-supply system recited in claim 1 wherein interconnections between the outer wall of the manifold segments and the base portions of the fuel injectors are provided O-rings inside detents as a means of mechanical attachment and fluid sealing.

* * * * *